(No Model.)
C. H. SCHOENLAND.
SAUSAGE STUFFING MACHINE.
No. 577,494. Patented Feb. 23, 1897.
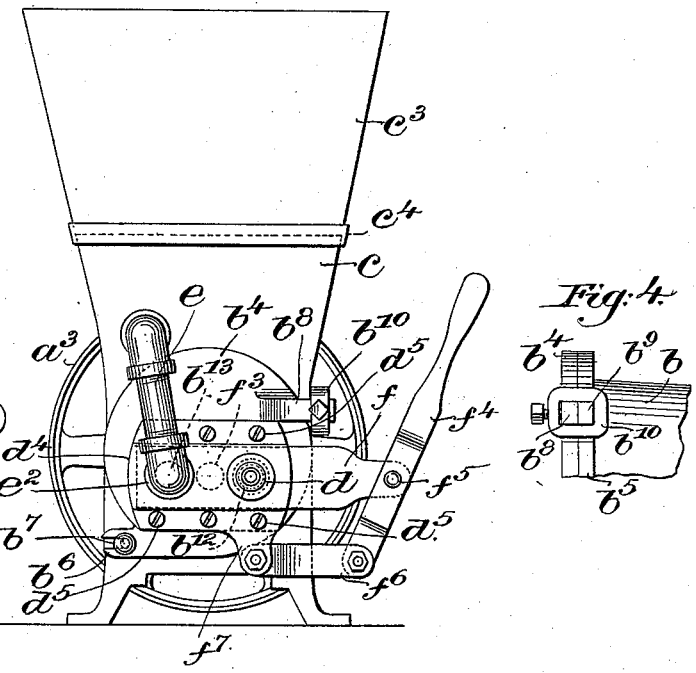
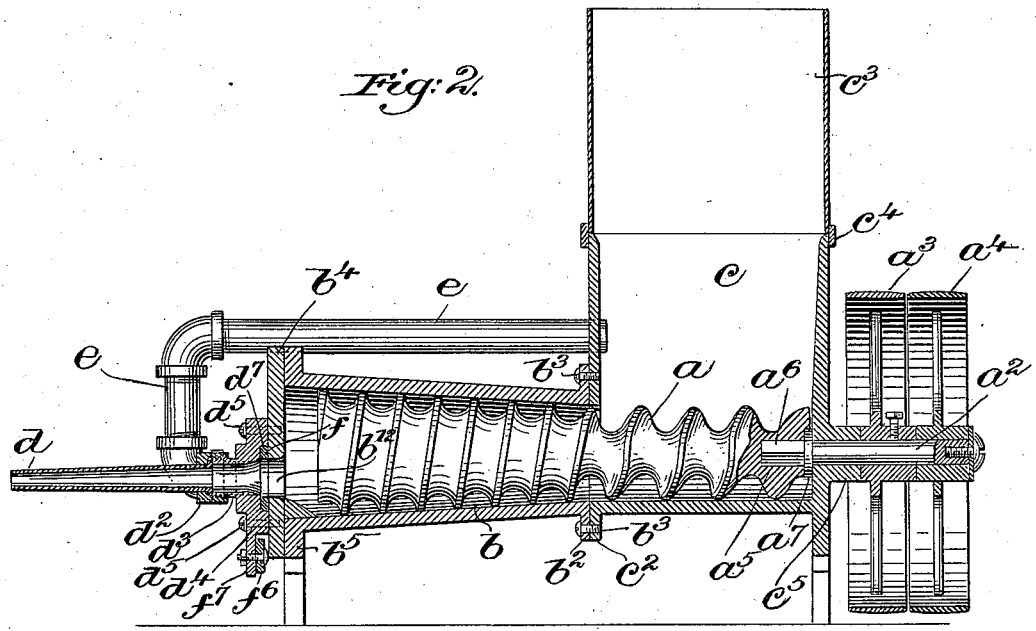
Witnesses.
Jas. J. Maloney
J. H. Livermore
Inventor:
C. Henry Schoenland
by Jos. P. Livermore
Atty.

UNITED STATES PATENT OFFICE.

CHARLES HENRY SCHOENLAND, OF LAWRENCE, MASSACHUSETTS.

SAUSAGE-STUFFING MACHINE.

SPECIFICATION forming part of Letters Patent No. 577,494, dated February 23, 1897.

Application filed August 21, 1896. Serial No. 603,437. (No model.)

*To all whom it may concern:*

Be it known that I, CHARLES HENRY SCHOENLAND, of Lawrence, county of Essex, and State of Massachusetts, have invented an Improvement in Sausage-Stuffing Machines, of which the following description, in connection with the accompanying drawings, is a specification, like letters on the drawings representing like parts.

The present invention relates to a sausage-stuffing machine, and is embodied in a machine having a continuously-operating feed mechanism whereby the meat is continually carried from the hopper in which it is fed toward the stuffing-nozzle, the said stuffing-nozzle being controlled by a valve by means of which the flow of meat through the said nozzle can be stopped after the skin is filled, so that a new skin can be applied to the nozzle.

Since the feed is continuous it is obviously necessary that while the stuffing-nozzle is shut off by the valve provision must be made for the meat which is being forced toward the said stuffing-nozzle, and to this end an outlet adjacent to said stuffing-nozzle is provided and adapted to be opened while the stuffing-nozzle is closed, so that the meat may continue to flow through said opening, thus rendering it unnecessary to stop the machine during the process of applying a new skin to the nozzle. The said stuffing-nozzle and the supplementary outlet for the meat, which may provide in any suitable way for the outflowing meat while the stuffing-nozzle is closed, are controlled as by a valve provided with an actuating device arranged so that the operator in manipulating the said actuating device to close one passage will by the same operation open the other passage, so that after a skin is filled it is necessary only to move the valve actuator or handle, which will cause the stuffing-nozzle to be closed and the supplementary passage opened. A new skin can then be applied to the nozzle and the valve-actuator moved in the reverse direction, thus cutting off the supplementary outlet and again opening the nozzle to fill another sausage-skin.

To provide for a continuous flow of meat during the operation of the machine, the supplemental outlet therefor is arranged to communicate with a passage or tube leading back to the hopper, said passage being hereinafter referred to as a "return-tube" or "mixing-tube," since the use thereof assists in producing a thorough admixture of the material during the operation of the machine.

The machine is preferably so arranged that the feeding device, which is preferably a worm connected with a rotating shaft, can be readily removed for cleaning or other purposes, the said worm being supported in a tubular passage closed at the end by a removable plate having two openings therein, one of which leads to the stuffing-nozzle and the other to the mixing or return tube.

Figure 1 is an end elevation of a machine embodying the invention. Fig. 2 is a longitudinal section of the same, the feeding device being mainly shown in elevation. Fig. 3 is a detail showing the valve which coöperates with the stuffing-nozzle and mixing-tube. Fig. 4 is a detail showing in side elevation the means for clamping the removable end piece upon the feed-chamber.

Referring to Fig. 2, the feeding device consists of a worm $a$, preferably somewhat tapered, as shown, and mainly supported in a tubular extension $b$, or "feed-chamber," as it may be called, leading from the hopper $c$ to the stuffing-nozzle $d$. The tubular extension $b$ is secured by means of the flange $b^2$ and screws $b^3$ to a similar flange $c^2$, extending around a lateral opening at the bottom of a receptacle or hopper $c$, which may be made of any usual form and is herein shown as rectangular, having somewhat flaring side walls, as indicated in Fig. 1, and preferably provided with a supplemental hopper portion $c^3$, mounted on the top of the main portion and secured thereto, as by a collar $c^4$. Thus meat which is fed into the hopper will fall upon the worm $a$, and in order that said meat may be fed by the said worm toward the stuffing-nozzle $b$ the said worm is adapted to be rotated by means of a shaft $a^2$, having fast and loose pulleys $a^3$ and $a^4$ thereon, the said worm being preferably provided with a squared socket $a^5$, fitting the correspondingly squared end $a^6$ of the shaft $a^2$. By this construction the worm $a$ can be readily removed by pulling it outward endwise from the tubular extension $b$, since it is not fastened to the shaft $a^2$, although when the machine is in operation it is obvious that the said worm will be held in its normal position by the reaction of the meat carried forward thereby, which will tend to thrust said worm back against a flange or hub $a^7$ at the end of the shaft $A^2$, which is provided for that purpose. The said shaft $a^2$ may be mounted in any suitable bearing and is herein shown as journaled in an extension $c^5$ from the wall of the hopper $c$.

The tubular extension $b$ is closed at its end by a removable plate $b^4$, bearing against the flanges $b^5$ and removably secured by means of a forked or slotted extension $b^6$, adapted to coöperate with a headed stud or projection $b^7$ from the face of the tubular extension $b$ and by another projection $b^8$, which, when the plate $b^4$ is in position, lies adjacent to an extension $b^9$, (see Fig. 4,) to which it is secured by a removable clamping-collar $b^{10}$. During the rotation of the worm $a$, therefore, the meat is forced along thereby through the tubular extension $b$, which is provided with an opening $b^{12}$, communicating with the stuffing-nozzle $d$, which is of any suitable or usual construction and adapted to receive a sausage-skin to be stuffed with meat issuing from the said nozzle.

In order to provide for a continuous operation of the machine, so that after a skin is filled a new one may be applied to the nozzle without stopping the feed-worm $a$, means are provided for closing the opening $b^{12}$, and to provide for the continuous flow of meat from the feed-chamber the end plate $b^4$ thereof is provided with a supplemental opening $b^{13}$, also provided with closing means, so that when either of said openings is closed the other may be opened, the closure of one and the opening of the other being preferably accomplished by a single operation of a suitable valve, as will be described. The said stuffing-nozzle $d$, which is a tapering nozzle, such as is commonly used in sausage-stuffing machines, is secured by a coupling $d^2$ to a tubular extension $c^3$ from the face of a supplemental plate $d^4$, secured, as by screws $d^5$, to the surface of the plate $b^4$. The said supplemental plate $d^4$ has openings through it in line with the openings $b^{12}$ and $b^{13}$, above described, the tubular extension $d^3$ being merely an elongation of one of said openings. The meat which issues from the supplemental opening $b^{13}$ while a new skin is being applied to the stuffing-nozzle $d$, as herein shown, is carried back to the hopper through a return or mixing tube $e$, the said tube being connected by a coupling-piece $e^2$ to a tubular extension of the opening $b^{13}$, (not shown,) similar to the extension $d^3$. The said mixing-tube $e$, as shown, is bent upward and rearward and extended back toward the hopper $c$, the end of said tube $e$ being inserted in an opening in the side of said hopper, so that meat forced into said tube will pass through the same back into the hopper to be again acted upon by the feeding device $a$. During the operation of the machine, therefore, the meat fed to the hopper will be driven forward through the tubular extension $b$ toward the stuffing-nozzle $d$ and the mixing-tube $e$. If, therefore, a sausage-skin is applied in the usual way to the stuffing-nozzle and the opening to the mixing-tube closed, it is obvious that the meat will be forced into the sausage-skin and will fill the same in the usual way. When the skin is filled, however, it becomes necessary to close the stuffing-nozzle in order to prevent the meat from being forced therethrough until another skin is applied, and for this purpose a valve $f$ is provided, adapted to close the said stuffing-nozzle and at the same time to open the other outlet, herein shown as the inlet to the mixing-tube, and vice versa. The said valve $f$ consists of a plate mounted in a guideway $d^7$, herein shown as a recess in the inner face of the supplemental plate $d^4$, in which the said plate $f$ is adapted to slide longitudinally. Through the said plate $f$ are two openings $f^2$ and $f^3$, the former being adapted, when the plate $f$ is in one position, namely, that shown in the drawings, to register with the opening $b^{12}$, and the latter, when the plate is in its other position, to register with the opening $b^{13}$. When, however, the plate $f$ is in the position shown in Figs. 1 and 2, the stuffing-nozzle $d$ is open and the mixing-tube $e$ closed by the unperforated portion of the plate $f$, which then lies between the opening $b^{12}$ and the inlet-opening of the tube $e$. By moving the plate $f$ to the left, however, it is obvious that the main portion of the said plate to the right of the opening $f^2$ will come in front of and close the inlet to the nozzle $d$, while the opening $f^3$ will come in line with the inlet to the tube $e$. In order to manipulate the said valve $f$, it is provided with an actuating-lever $f^4$, to which it is pivotally connected at $f^5$, the said lever in turn being pivotally connected to a stationary portion of the machine, being herein shown as connected at this end with a link $f^6$, pivoted to a lug $f^7$, which extends downward from the supplemental plate $d^4$. Thus during the operation of the machine the meat is continuously in motion, passing around through the mixing-tube between each two stuffing operations, the result being that the meat becomes more thoroughly mixed and that no time is lost in the operation, as it is not necessary to shut down the power or stop the machine while a new skin is being applied to the stuffing-nozzle.

As soon as the skin is stuffed the operator manipulates the valve to close the stuffing-nozzle, places a new skin thereon, and again manipulates the valve to open the stuffing-nozzle, this operation being repeated as long as the machine is in use.

While the specific construction here shown is not essential to the proper embodiment of the invention, the working parts of the machine are thereby rendered very readily accessible for cleaning purposes or the like, it being obvious that by simply removing the collar $b^{10}$ the plate $b^4$ may be removed by sliding the slotted projection $b^6$ out from behind the head of the stud $b^7$, it being obviously not essential that the tube $e$ should be in any way fastened to the wall of the hopper $c$.

After the removal of the end plate and the nozzle, tube, and valve, all of which may be connected thereto and removable therewith, it is obvious that the worm $a$ can be drawn endwise out from the hopper $c$, so that the whole interior of the said hopper and tube $b$ are perfectly accessible, as well as the feeding device $a$ itself.

I claim—

1. In a sausage-stuffing machine provided with a feed-supply hopper, the combination with a continuously-operating feed device adapted to carry the meat away from said hopper, of a stuffing-nozzle adapted to receive meat therefrom, a return-tube also adapted to receive meat therefrom, and itself communicating with the said hopper, and means for opening and closing the said stuffing-nozzle and return-tube, substantially as described.

2. In a sausage-stuffing machine, the combination with a hopper provided with a lateral tubular extension, of a rotatable worm extending through said extension into said hopper, a cover for the end of said extension provided with openings communicating respectively with a stuffing-nozzle and a return-tube leading to the hopper, and a valve controlling said openings, and adapted by its movement in either direction to open one and close the other, substantially as described.

3. In a sausage-stuffing machine, the combination of a feed-hopper having a lateral tubular extension therefrom, of a driving-shaft in alinement with said extension, a feeding device comprising a worm adapted to be inserted longitudinally into said extension, and having a socket adapted to fit the end of said shaft, a removable cover for said extension provided with two openings, a stuffing-nozzle and a mixing-tube secured thereto, and respectively communicating with said openings, and a valve controlling said openings, substantially as and for the purpose described.

In testimony whereof I have signed my name to this specification in the presence of two subscribing witnesses.

C. HENRY SCHOENLAND.

Witnesses:
H. J. LIVERMORE,
JOHN F. C. PREINKERT.